(12) United States Patent
Chandra

(10) Patent No.: US 7,383,520 B2
(45) Date of Patent: Jun. 3, 2008

(54) METHOD AND APPARATUS FOR OPTIMIZING THERMAL MANAGEMENT SYSTEM PERFORMANCE USING FULL-CHIP THERMAL ANALYSIS OF SEMICONDUCTOR CHIP DESIGNS

(75) Inventor: Rajit Chandra, Cupertino, CA (US)

(73) Assignee: Gradient Design Automation Inc., Santa Clara, CA (US)

( * ) Notice: Subject to any disclaimer, the term of this patent is extended or adjusted under 35 U.S.C. 154(b) by 65 days.

(21) Appl. No.: 11/198,467

(22) Filed: Aug. 5, 2005

(65) Prior Publication Data

US 2008/0066022 A1    Mar. 13, 2008

Related U.S. Application Data

(63) Continuation-in-part of application No. 10/979,957, filed on Nov. 3, 2004, now Pat. No. 7,194,711.

(60) Provisional application No. 60/599,278, filed on Aug. 5, 2004.

(51) Int. Cl.
*G06F 17/50* (2006.01)

(52) U.S. Cl. .............................. 716/4; 716/2

(58) Field of Classification Search .................. 716/2, 716/4–6, 18
See application file for complete search history.

(56) References Cited

U.S. PATENT DOCUMENTS

| | | | |
|---|---|---|---|
| 4,696,578 A | 9/1987 | Mansuria et al. | |
| 5,654,904 A | 8/1997 | Thakur | |
| 5,710,068 A | 1/1998 | Hill | |
| 6,124,635 A | 9/2000 | Kuwabara | |
| 6,247,161 B1 | 6/2001 | Lambrecht et al. | |
| 6,320,201 B1 | 11/2001 | Corbett et al. | |
| 6,389,582 B1 * | 5/2002 | Valainis et al. | 716/9 |
| 6,505,326 B1 * | 1/2003 | Farral et al. | 716/5 |
| 6,532,570 B1 | 3/2003 | Mau | |
| 6,591,399 B1 | 7/2003 | Wyrzykowska et al. | |
| 6,634,013 B2 | 10/2003 | Shinzawa | |
| 6,662,345 B2 | 12/2003 | Uchida et al. | |
| 6,751,781 B2 * | 6/2004 | Lin et al. | 716/1 |
| 6,769,102 B2 | 7/2004 | Frank et al. | |
| 6,931,369 B1 | 8/2005 | Perry et al. | |
| 6,993,742 B2 | 1/2006 | Fryer et al. | |
| 7,025,280 B2 | 4/2006 | Kaushal et al. | |
| 7,039,888 B2 * | 5/2006 | Steinmann et al. | 716/5 |
| 7,096,450 B2 | 8/2006 | Gill et al. | |

(Continued)

OTHER PUBLICATIONS

Wang, Ting-Yuan, et al., "Thermal-ADI-A Linear-Time Chip-Level Dynamic Thermal-Simulation Algorithm Based on Alternating-Direction-Implicit (ADI) Method", IEEE Transactions on Very Large Scale Integration (VLSI) Systems, vol. 11, No. 4, dated Aug. 4, 2003, pp. 691-700.

(Continued)

*Primary Examiner*—Jack Chiang
*Assistant Examiner*—Binh Tat

(57) ABSTRACT

A method and apparatus for optimizing cooling system performance using full-chip thermal analysis of semiconductor chip designs is provided. One embodiment of a novel method for optimizing the cooling of an electronic system incorporating at least one semiconductor chip includes receiving full-chip temperature data for the semiconductor chip(s) and configuring the cooling system for dissipating heat from the electronic system in accordance with the full-chip temperature data.

29 Claims, 7 Drawing Sheets

U.S. PATENT DOCUMENTS

| | | | |
|---|---|---|---|
| 7,162,402 | B2 | 1/2007 | Daems et al. |
| 7,171,346 | B1 | 1/2007 | Recker et al. |
| 7,191,112 | B2 | 3/2007 | Demler et al. |
| 7,191,413 | B2 | 3/2007 | Chandra et al. |
| 7,194,711 | B2 * | 3/2007 | Chandra ................ 716/4 |
| 7,203,920 | B2 * | 4/2007 | Chandra ................ 716/6 |
| 7,263,477 | B2 | 8/2007 | Chen et al. |
| 2001/0032330 | A1 | 10/2001 | Kusunoki |
| 2003/0226122 | A1 | 12/2003 | Hathaway et al. |
| 2005/0044515 | A1 | 2/2005 | Acar et al. |
| 2005/0138581 | A1 | 6/2005 | Usui |
| 2005/0149886 | A1 | 7/2005 | Kaushal et al. |
| 2005/0155004 | A1 | 7/2005 | Mitiko et al. |
| 2005/0166166 | A1 | 7/2005 | Chandra et al. |
| 2005/0210425 | A1 | 9/2005 | Keller et al. |
| 2006/0031794 | A1 | 2/2006 | Li et al. |
| 2007/0157137 | A1 | 7/2007 | Chandra |

OTHER PUBLICATIONS

Wang, Ting-Yuan, et al., "3D Thermal-ADI-An Efficient Chip-Level Transient Thermal Simulator", ISPD'03, Apr. 6-9, 2003, Monterey, California, USA http://www.ece.wisc.edu/~vlsi/research/ISPD2003_p005-wang.pdf, Copy consists of "8" unnumbered pages.

Wang, Ting-Yuan, et al., "3-D Thermal-ADI: A linear-Time Chip Level Transient Thermal Simulator", IEEE Transactions on Computer-Aided Design of Integrated Circuits and Systems, vol. 21, No. 12, dated Dec. 2002, pp. 1434-1445.

Wang, Ting-Yuan, et al., "Thermal-ADI: A Linear-Time Chip-Level Dynamic Thermal Simulation Algorithm Based on Alternating-Direction-Implicit (ADI) Method", ISPD'01, Apr. 1-4, 2001, Sonoma, California, USA http://www.ece.wisc.edu/~vlsi/research/ISPD2001_wang.pdf , Copy consists of "6" unnumbered pages.

International Search Report and Written Opinion for PCT/US2006/062184; copy consists of 11 unnumbered pages.

Szekely, V., et al, A thermal benchmark chip: design and applications:, Components, Packaging, and Manufacturing Technology, Part A, IEEE Transactions on vol. 21, Issue 3, Sep. 1998, pp. 399-405.

Hang, Li, et al., "Efficient thermal simulation for run-time temperature tracking and management", Computer Design: VLSI in Computers and Processors, 2005, ICCD 2005, Proceedings 2005 IEEE International Conference on Oct. 2-5, 2005, pp. 130-133.

Lin, Sheng-Chih, "Cool Chips: Opportunities and Implications for Power and Thermal Management", IEEE Transactions on Electron Devices, vol. 55, No. 1, Jan. 2008 pp. 245-255.

* cited by examiner

METHOD AND APPARATUS FOR OPTIMIZING THERMAL MANAGEMENT SYSTEM PERFORMANCE USING FULL-CHIP THERMAL ANALYSIS OF SEMICONDUCTOR CHIP DESIGNS

CROSS REFERENCE TO RELATED APPLICATIONS

This application is a continuation-in-part of U.S. patent application Ser. No. 10/979,957, filed Nov. 3, 2004 now U.S. Pat. No. 7,194,711. In addition, this application claims the benefit of U.S. Provisional patent application Ser. No. 60/599,278, filed Aug. 5, 2004.

FIELD OF THE INVENTION

The present invention generally relates to computing devices, and more particularly relates to systems for regulating the temperatures of computing devices.

BACKGROUND OF THE INVENTION

Semiconductor chips typically comprise the bulk of the components in an electronic system. These semiconductor chips are also often the hottest part of the electronic system, and failure of the system can often be traced back to thermal overload on the chips. Thermal management of semiconductor chips is therefore a critical parameter of electronic design, as it influences the design of the cooling system for a computing device or system incorporating the semiconductor chip.

FIG. 1 is a schematic diagram illustrating an exemplary semiconductor chip 100. As illustrated, the semiconductor chip 100 comprises one or more semiconductor devices 102a-102n (hereinafter collectively referred to as "semiconductor devices 102"), such as transistors, resistors, capacitors, diodes and the like deposited upon a substrate 104 and coupled via a plurality of wires or interconnects 106a-106n (hereinafter collectively referred to as "interconnects 106"). These semiconductor devices 102 and interconnects 106 share power, thereby distributing a thermal gradient over the chip 100 that may range from 100 to 180 degrees Celsius in various regions of the chip 100.

Many methods currently exist for performing thermal analysis of semiconductor chips designs, e.g., to ensure that a chip constructed in accordance with a given design will not overheat and trigger a failure when deployed within an intended system. Such conventional methods, however, typically fail to provide a complete or an entirely accurate picture of the chip's operating thermal gradient. For example, typical thermal analysis models attempt to solve the temperature on the chip substrate, but do not solve the temperature in a full three dimensions, e.g., using industry standards design, package and heat sink data. Moreover, most typical methods do not account for the sharing of power among semiconductor devices and interconnects, which distributes the heat field within the chip, as discussed above. As a result, thermal management systems designed manage internal temperatures and/or thermal gradients in the chip (and/or system incorporating the chip) in operation (e.g., by dissipating heat from the chip or warming specific locations on the chip) are inefficiently designed. In fact, typical thermal management systems are designed with little or no knowledge of actual chip temperatures and gradients at all. This often leads to chip and/or system failure due to overheating or waste as excess cooling resources are directed to regions in which they are not needed.

Therefore, there is a need in the art for a method and apparatus for optimizing thermal management system performance using full-chip thermal analysis of semiconductor chip designs.

SUMMARY OF THE INVENTION

A method and apparatus for optimizing thermal management system performance using full-chip thermal analysis of semiconductor chip designs is provided. One embodiment of a novel method for optimizing the thermal management of an electronic system incorporating at least one semiconductor chip includes receiving full-chip temperature data for the semiconductor chip(s) and configuring the thermal management system for managing heat in the electronic system in accordance with the full-chip temperature data.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION

Embodiments of the invention generally provide a method and apparatus for optimizing the design of a thermal management system in an electronic system (e.g., a computing device such as a desk top computer, a laptop computer, a tablet computer, a personal digital assistant, a cellular telephone, a gaming console or the like) using full-chip temperature data for semiconductor chips incorporated in the electronic system. One embodiment of the inventive method analyzes a full, three-dimensional solution of temperature values within a chip design, including power dissipation values distributed over semiconductor devices (e.g., transistors, resistors, capacitors, diodes and the like) and wire interconnects. This provides more a more accurate view of the thermal conditions within the electronic device, thereby enabling a thermal management system designer to configure the thermal management system to manage heat in the electronic system in the most efficient manner.

As used herein, the term "semiconductor chip" refers to any type of semiconductor chip, which might employ analog and/or digital design techniques and which might be fabricated in a variety of fabrication methodologies including, but not limited to, complementary metal-oxide semiconductor (CMOS), bipolar complementary metal-oxide semiconductor (BiCMOS), and gallium arsenide (GaAs) methodologies. Furthermore, as used herein, the term "semiconductor device" refers to a potential active heat dissipating device in a semiconductor chip, including, but not limited to, transistors, resistors, capacitors, diodes and inductors. The terms "wire", "interconnect" or "wire interconnect" as used herein refer to any of various means of distributing electrical signals (which may be analog or digital, static or dynamic, logic signals or power/ground signals) from one place to another. "Interconnects" may be on a semiconductor chip itself, used in the packaging of the semiconductor chip, deployed between the semiconductor chip and the packaging, or used in a variety of other ways.

Figure 1:
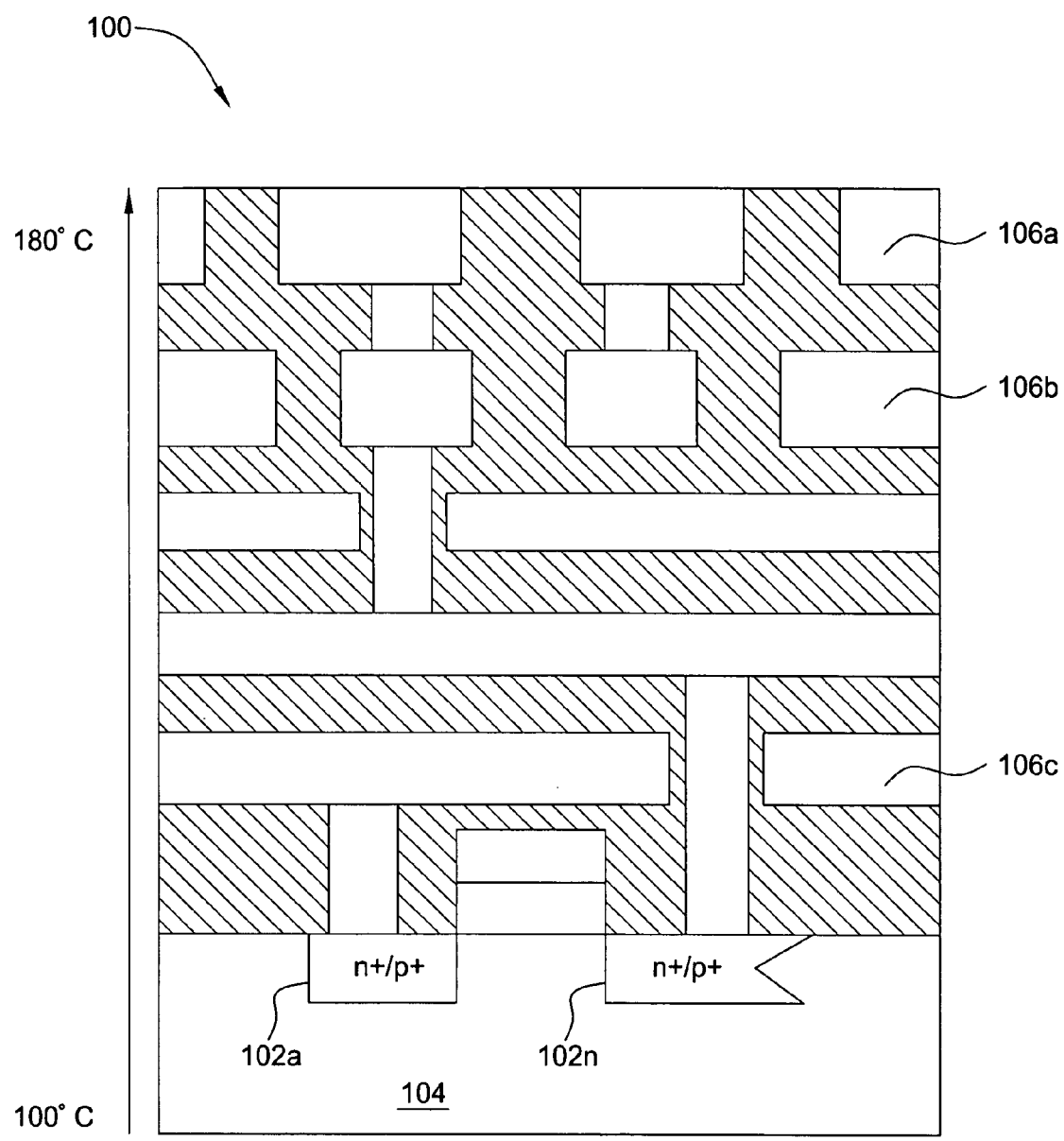
FIG. 1 is a schematic diagram illustrating an exemplary semiconductor chip.
Figure 2:
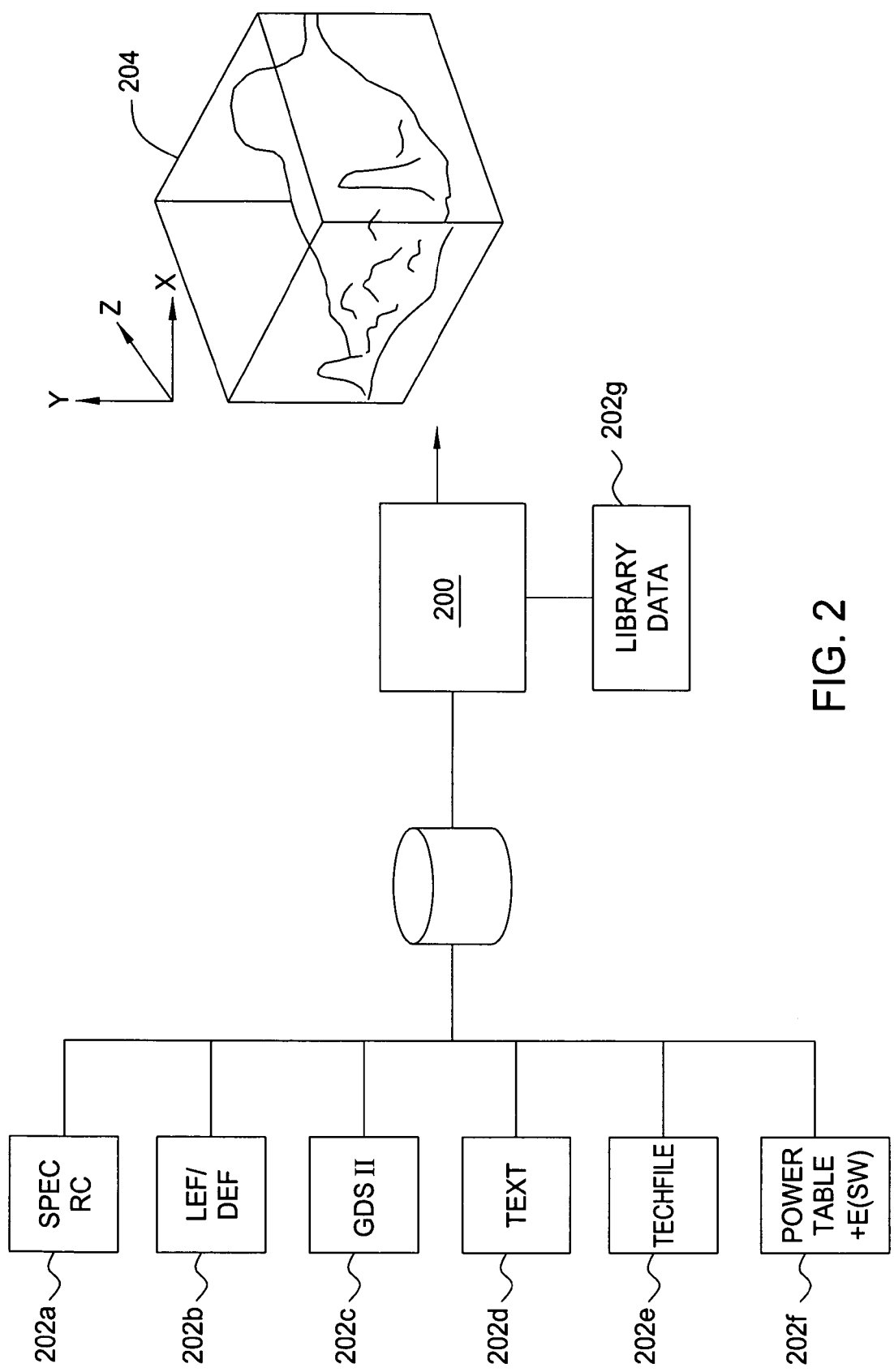
FIG. 2 is a schematic diagram illustrating one implementation of a thermal analysis tool according to the present invention.

FIG. 2 is a schematic diagram illustrating one implementation of a thermal analysis tool 200 according to the present invention. As illustrated, the thermal analysis tool 200 is adapted to receive a plurality of inputs 202a-202g (hereinafter collectively referred to as "inputs 202") and process these inputs 202 to produce a full-chip (e.g., three-dimensional) thermal model 204 of a proposed semiconductor chip design.

In one embodiment, the plurality of inputs 202 includes industry standard design data 202a-202f (e.g., pertaining to the actual chip design or layout under consideration) and library data 202g (e.g., pertaining to the semiconductor devices and interconnects incorporated in the design). In one embodiment, the industry standard design data includes one or more of the following types of data: electrical component extraction data and extracted parasitic data (e.g., embodied in standard parasitic extraction files, or SPEFs, 202a), design representations including layout data (e.g., embodied in Library Exchange Format/Design Exchange Format, or LEF/DEF files 202b, Graphical Design Format II, or GDSII, files 202c and/or text files 202d), manufacturer-specific techfiles 202e describing layer information and package models, user-generated power tables 202f including design data (e.g., including a switching factor, E(sw)). In one embodiment, this industry standard design data 202a-202f is stored in a design database such as an open access database or a proprietary database. In one embodiment, the library data 202g is embodied in a library that is distributed by a semiconductor part manufacturer or a library vendor. In another embodiment, the library incorporating the library data 202g can be built in-house by a user.

In one embodiment, the library data 202g includes transistor and diode models that are used to characterize the transistor resistances ($R_{dv}$) of the driver circuits, e.g., such as models available through Berkeley short-channel Insulated Gate Field Effect Transistor (IGFET) model (BSIM) models used by circuit simulators including Simulation Program with Integrated Circuit Emphasis (SPICE), HSPICE, commercially available from Synopsys, Inc. of Mountain View, Calif. and Heterogeneous Simulation Interoperability Mechanism (HSIM, commercially available from Nassda Corporation of Santa Clara, Calif.), all developed at the University of California at Berkeley.

As mentioned above, the plurality of inputs 202 are provided to the thermal analysis tool 200, which processes the data in order to produce a full-chip thermal model 204 of a proposed semiconductor chip design. In one embodiment, the full-chip thermal model is a three-dimensional thermal model.

Thus, as described above, embodiments of the present invention rely on library data representing the electrical properties of a semiconductor chip design (e.g., the resistance and capacitance at various points) and the manners in which these properties may vary with respect to each other and with respect to other phenomena (e.g., temperature or fabrication variations). Those skilled in the art will appreciate that these electrical properties may be specified or calculated in any number of ways, including, but not limited to, table-driven lookups, formulas based on physical dimensions, and the like.

Figure 3:
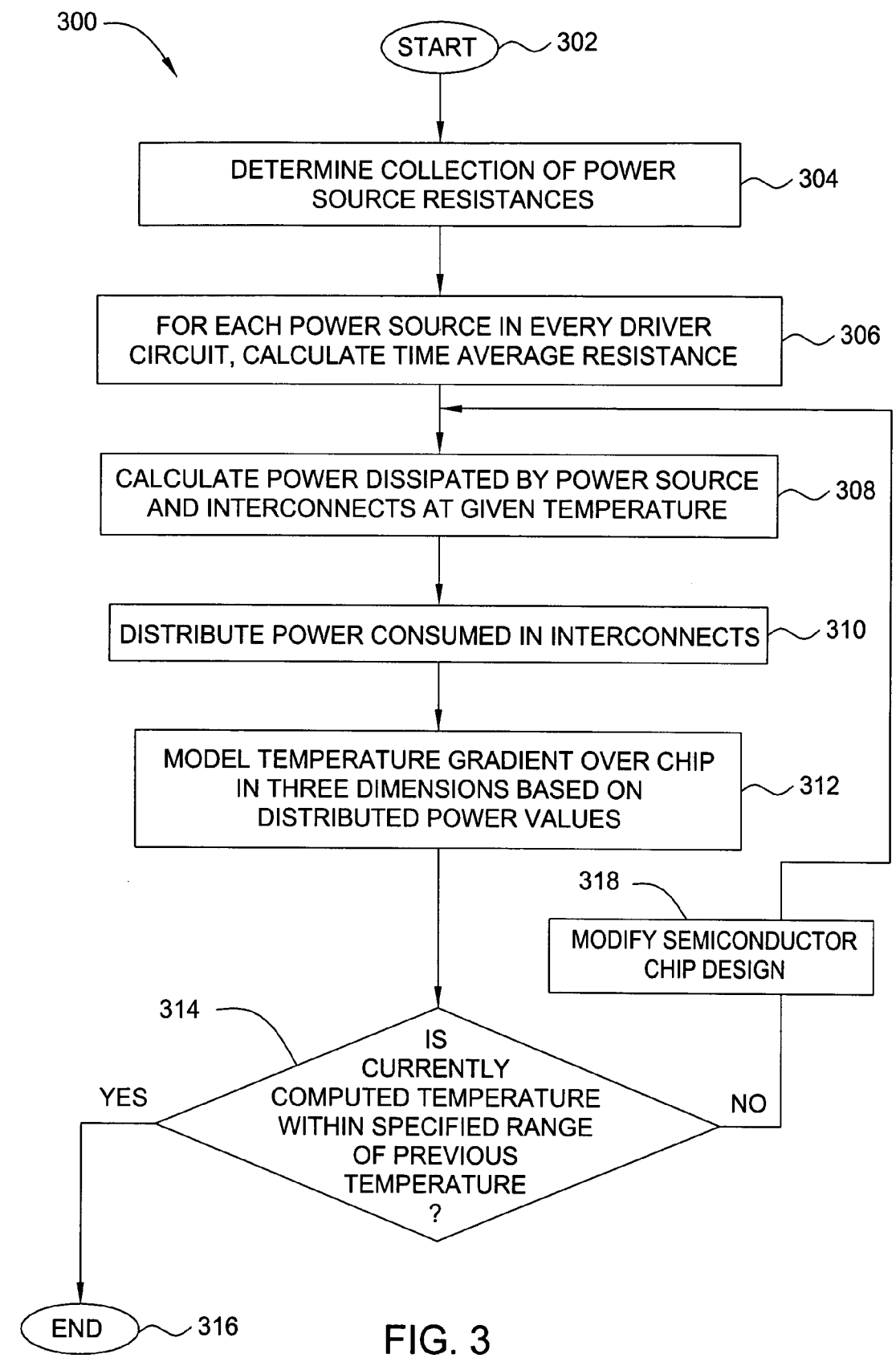
FIG. 3 is a flow diagram illustrating one embodiment of a method for performing three-dimensional thermal analysis of a semiconductor chip design according to the present invention.

FIG. 3 is a flow diagram illustrating one embodiment of a method 300 for performing full-chip thermal analysis of a semiconductor chip design according to the present invention. The method 300 may be implemented, for example, in the thermal analysis tool 200 illustrated in FIG. 2. In one embodiment, the method 300 relies on the computation of power dissipated by various semiconductor devices of the semiconductor chip design. As will be apparent from the following discussion, this power computation may be performed in any number of ways, including, but not limited to, table-driven lookups, computations based on electrical properties, circuit simulations, and the like. Moreover, those skilled in the art will appreciate that although the following description discusses the effects of resistance on power dissipation, power dissipation computations could be based on any number of other electrical properties or parameters, including, but not limited to, capacitance, inductance and the like. Moreover, the computations could be static or dynamic.

The method 300 is initialized at step 302 and proceeds to step 304, where the method 300 determines the collection of semiconductor devices (e.g., transistor, resistors, capacitors, diodes inductors and the like) and their resistances. In one embodiment, the method 300 determines this information by reading one or more of the chip layout data (e.g., in GDS II, DEF and/or text format), layer and package model data (e.g., from one or more techfiles), and initial power and power versus temperature data for the semiconductor devices (e.g., from the library data). In one embodiment, initial power values and power values as a function of temperature may be recorded within a common power table for acceptable operating ranges for the driver circuits within the chip design. The driver circuits may be at semiconductor device level or at cell level, where cell level circuits represent an abstraction of interconnected semiconductor devices making up a known function.

In step 306, the method 300 uses the information collected in step 304 to calculate the time average resistance values for every semiconductor device in every driver circuit of the chip design, as well as for every diode junction. These time-average resistance values relate to changes in semiconductor device dimensions (e.g., such as using higher power transistors in place of lower power transistors in a chip design). In one embodiment, the time average resistance value, $R_{average}$ for a semiconductor device is calculated as:

$$R_{average} = \frac{\int_0^{t_r} Rdv(t)dt}{t_r} \qquad (\text{EQN. 1})$$

where $t_r$ is the output transition time of the driver circuit under consideration, e.g., as specified by the library data.

Figure 4:
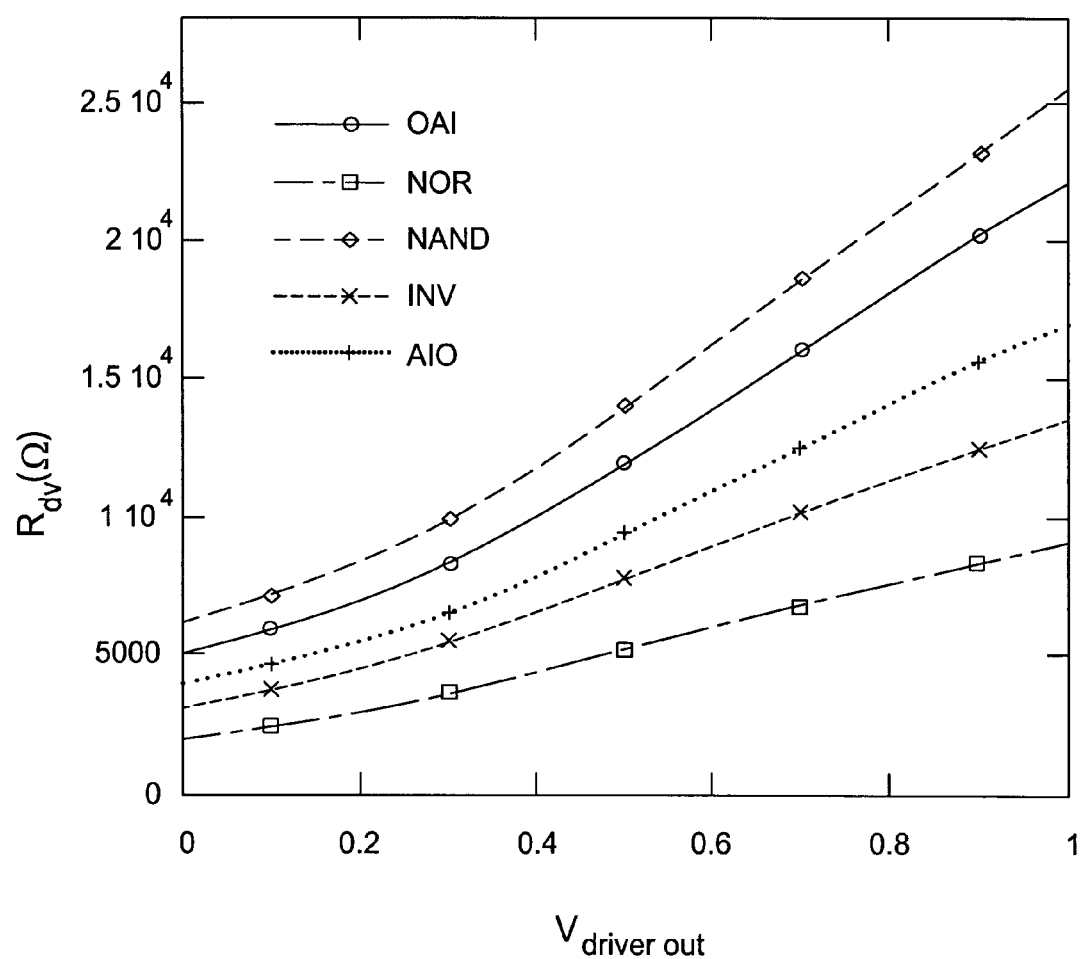
FIG. 4 is a graph illustrating the change in value of transistor resistance for an exemplary negative channel metal oxide semiconductor as a function of the output translation voltage.

FIG. 4 is a graph illustrating the change in value of transistor resistance, $R_{dv}$, for an exemplary negative channel metal oxide semiconductor (nMOS) as a function of the output transition voltage, $V_{driver\_out}$. As illustrated, the power dissipated by a transistor varies during switching. This is also true for the power dissipated in other semiconductor devices and in the interconnects coupled to the semiconductor devices on the chip.

Referring back to FIG. 3, in step 308, the method 300 calculates the power dissipated by the semiconductor devices and interconnects at a given temperature for the design under consideration. In one embodiment of step 308, e.g., where a steady-state analysis of the chip design is being performed, the interdependence of temperature and average power is captured through pre-characterized parameters of the semiconductor devices and interconnects. In one embodiment, the power dissipated by a semiconductor device (in this exemplary case, a transistor), $P_{transistor}$, is calculated as:

$$P_{transistor} = (V_d)^2 / R_{average} \qquad (\text{EQN. 2})$$

where $V_d$ is the power supply voltage supplied to the transistor. This voltage, $V_d$, is less than the actual power supply voltage, $V_{dd}$, as the current drawn by the transistors and flowing through the interconnects that connect the transistors to a power supply causes a voltage drop. In another embodiment, the power supply voltage to the transistor $V_d$ could be divided by the maximum or minimum resistance value, $R_{max}$ or $R_{min}$, in order to calculate the power dissipated in the transistor. In one embodiment, a decision as to whether to use an average, minimum or maximum resistance value to calculate $P_{transistor}$ is based at least in part on whether additional conditions, such as the operation of the circuit, are to be evaluated.

While equations for calculating the power dissipation of transistors have been provided herein by way of example, those skilled in the art will appreciate that various methods of calculating power dissipation for other semiconductor devices, such as resistors, capacitors and diodes, are known in the art. For example, equations for calculating the power dissipation of a resistor are discussed in the Proceedings of the Fourth International Symposium on Quality Electronic Design (ISQED 2003), 24-26 March 2003, San Jose, Calif.

In one embodiment, the power dissipated by the interconnects (e.g., power and signal lines), $P_{interconnect}$ is calculated as:

$$P_{interconnect} = P - P_{transistor} \qquad (\text{EQN. 3})$$

where P is the average electrical power dissipated per clock cycle by a digital circuit (e.g., the chip design under consideration; for the full chip, the total P is the sum of the power dissipated by each circuit in the chip) and is available from the library data 202g. In the power lines, power is typically dissipated as Joule heating, where the dissipated power $P_{dissipated}$ may be calculated as:

$$P_{dissipated} = I_p^2 R_{power} \qquad (\text{EQN. 4})$$

where $I_p$ is the current through the power lines and $R_{power}$ is the resistance of the power bus. The value of Ip may be calculated by commercially available tools, such as Voltage Storm, available from Cadence Design Systems, Inc. of San Jose, Calif.

Typically, the power drawn by a switching transistor may be calculated as:

$$P = C_{load} V_{dd} E(sw)(fclk) \qquad (\text{EQN. 5})$$

where $C_{load}$ is the output capacitance as even by the circuit, E(sw) is the switching activity as defined by the average number of output transistors per clock period, and fclk is the clock frequency. The switching factor or acrivity, E(sw), is used for evaluating the power table for the initial state of the design. $C_{load}$ may be calculated by parasitic extraction tools, and values for fclk and $V_{dd}$ are typically specified for a given design. In general, half of the power, P, is stored in the capacitance and the other half is dissipated in the transistors and interconnects (e.g., the power and signal lines). Those skilled in the art will appreciate that since $R_{average}$ varies with the transition time of the circuits, and as the switching activity changes for different modes of operation, E(sw) will also change, thereby changing the value of P and the distribution of the amounts of power dissipated in the transistors (e.g., see Equation 2) and interconnects. This will, in turn, change the heat fields and corresponding temperatures within the chip.

In another embodiment of step 308, a transient analysis is performed, wherein the interdependence of temperature and average power in the semiconductor devices and interconnects is based on instantaneous values of power. In this case, power dissipated values are calculated by dynamically simulating the circuit embodied in the chip design under consideration. For example, the circuit may be simulated using any commercially available circuit simulator, such as HSPICE or HSIM, discussed above, or SPECTRE, commercially available from Cadence Design Systems. In one embodiment, the circuit is simulated by solving for values of electrical attributes (e.g., current and voltages) at various points in time. In the case of transient thermal analysis, the thermal analysis system (e.g., thermal analysis tool 200 of FIG. 2) drives the circuit simulator to calculate power at discrete points whenever there is a sufficient change in the temperature of the circuit. In one embodiment, the sufficiency of a temperature change for these purposes is determined by a predefined threshold.

In step 310, the method 300 distributes the power consumed in each of the interconnects. In one embodiment, power is distributed based on the resistance of the wires used in the interconnects, which is defined by the type, thickness and height of the wires used in the interconnects. In one embodiment, the resistance, $R_{interconnect}$, of an interconnect segment is calculated as:

$$R_{interconnect} = \frac{\rho L}{wt} \qquad (\text{EQN. 6})$$

where L is the length of the interconnect segment, w is the width of the segment, t is the thickness of the segment, and ρ is a resistivity constant dependent upon the type of wire used. The resistivity constant, ρ, may be found in tables included in any number of integrated circuits textbooks, including Rabaey et al., *Digital Integrated Circuits*, Second Edition, Practice Hall Electronic and VLSI Series, 2002.

In step 312, the method 300 uses the power dissipation and distribution information calculated in steps 306-310 to model a full-chip (e.g., three-dimensional) temperature gradient over the chip design under consideration. In one embodiment, a full-chip temperature gradient is modeled by adaptively partitioning the volumes of steep temperature gradients over the chip design. In one embodiment, partitioning is done in three dimensions; however, in other embodiments, partitioning may be done in one or two dimensions as well (for example, vertical partitioning may be explicitly considered in how the temperature is modeled). In one embodiment, "steep" temperature gradients are those portions of the overall temperature gradient that are steep relative to other regions of the overall temperature gradient. In one embodiment, techfile data (e.g., pertaining to the dimensions and properties of the chip design layers) and power density data are used to partition the chip design. Power density data is typically contained within the power table provided for a particular state of operation of a chip design. The temperatures in each partition are then determined and annotated accordingly in the three-dimensional model.

In step 314, the method 300 determines whether the currently computed temperature for the chip design falls within a previously specified range. If the method 300 concludes that the currently computed temperature does not fall within this range, the method 300 proceeds to step 318 and modifies the chip design (e.g., by changing the resistances of the semiconductor devices and interconnects, resizing the semiconductor devices and interconnect wires, etc.). The method 300 then returns to step 308 and proceeds as discussed above.

Alternatively, if the method 300 determines that the currently computed temperature does fall within the specified range, the method 300 proceeds to step 316 and terminates. Thus, steps of the method 300 may be repeated in an iterative manner until a steady start value is reached, within a specified tolerance. In one embodiment, iteration of these steps may depend on the particular implementation of the method 300. In further embodiments, iteration could include convergence to an absolute value, convergence to a relative value, or the passing of a fixed number or iterations or a fixed amount of time.

Thus, the method 300 employs industry standard design, package and heat sink data in order to produce a more complete and more accurate profile of the temperature gradient created by a semiconductor chip design. By accounting for the distribution of power dissipated in the semiconductor devices and in the interconnects, rather than simply characterizing dissipated power as the power dissipated in the active semiconductor devices (which does not consider simultaneous changes in the electrothermal properties of the semiconductor devices and interconnects), more accurate, full-chip thermal profiling can be achieved.

Chip designers may use the full-chip data produced by the method 300 to design more robust semiconductor chips for particular applications. For example, if the full-chip temperature gradient produced by one iteration of the method 300 does not illustrate acceptable results for a semiconductor chip design, a chip designer may go back and modify the chip design (e.g., by changing the resistances of the semiconductor devices and interconnects, resizing the semiconductor devices and interconnect wires, etc.) in an attempt to achieve more desirable results. The method 300 may then be applied to the modified design to assess the resistant temperature gradient. Those skilled in the art will appreciate that while the method 300 illustrates a series of steps, the present invention is not limited to the particular sequence illustrated, and thus FIG. 3 should be considered only as one exemplary embodiment of the present invention.

In one embodiment, the full-chip temperature data produced by the method 300 may be implemented to optimize the design of a thermal management system for managing heat in a semiconductor chip and/or an electronic system or computing device incorporating the semiconductor chip. That is, the full-chip temperature data may guide a thermal management system or electronic system designer in more precisely identifying those areas of the chip and/or electronic system that require the most cooling or warming, or the least cooling or warming, thereby enabling efficient design and use of thermal management resources. Design of the thermal management system may additionally include the design of an interface between the thermal management system and the semiconductor chip or package whose thermal characteristics are to be regulated by the thermal management system. The thermal management system may comprise a cooling system (e.g., a mechanical or fluid cooling system) for dissipating heat from specific areas of the semiconductor chip and/or a heating system for warming specific areas of the semiconductor chip (e.g., in order to locally minimize thermal gradients). Furthermore, the thermal management system may comprise a plurality of components distributed over each semiconductor chip and/or other components of the electric system (e.g., each semiconductor chip may have its own "mini" thermal management system that is part of the thermal management system for the overall electric system). The full-chip temperature data may aid in the optimization of substantially any thermal management system, including external thermal management systems and internal or on-chip thermal management systems.

Figure 5:
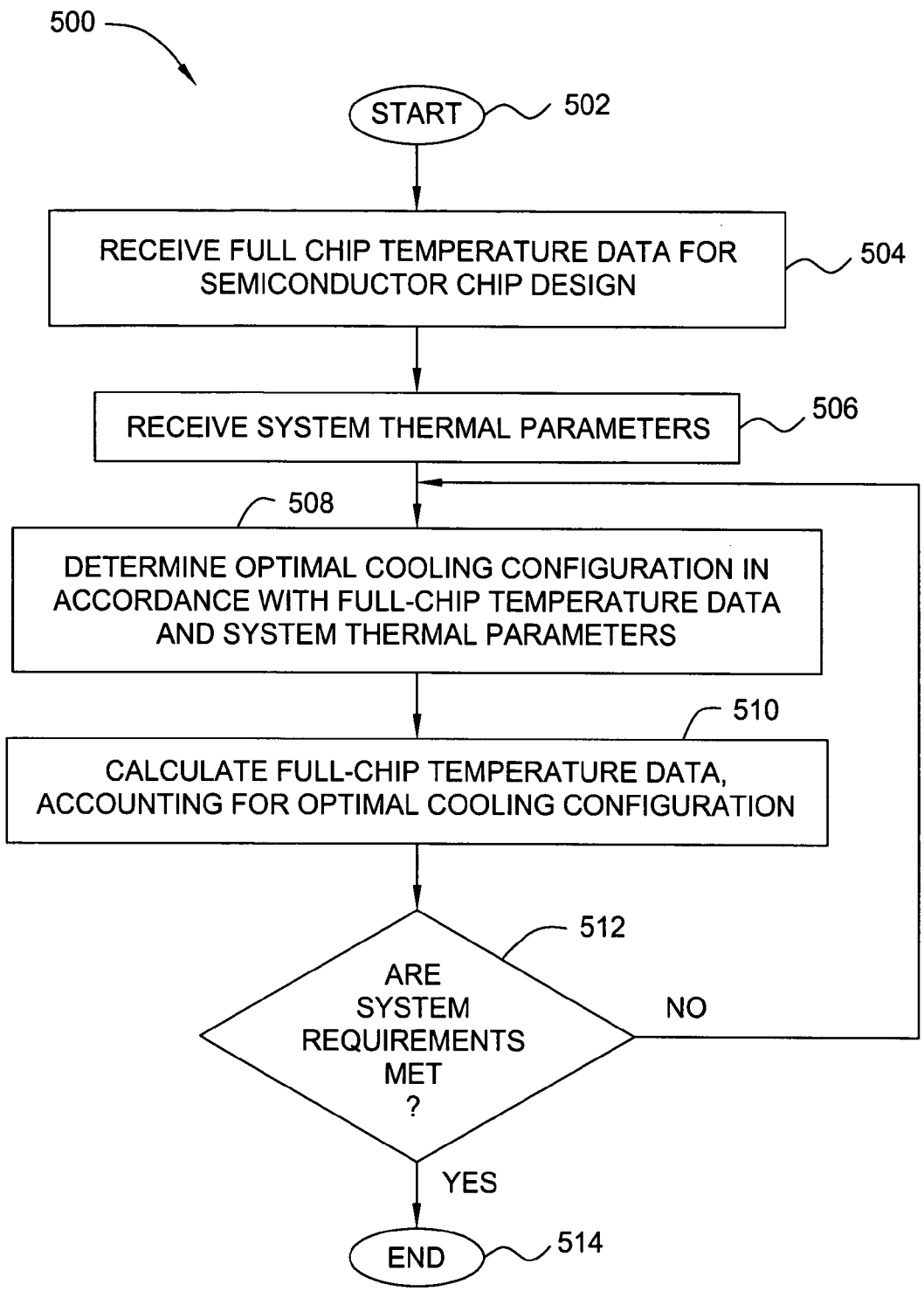
FIG. 5 is a flow diagram illustrating one embodiment of a method for optimizing the design of a thermal management system based on knowledge of full-chip thermal gradients.

FIG. 5 is a flow diagram illustrating one embodiment of a method 500 for optimizing the design of a thermal management system based on knowledge of full-chip thermal gradients. The method 500 is initialized at step 502 and proceeds to step 504, where the method 500 receives full-chip temperature data for at least one semiconductor chip incorporated within the electronic system to be managed by the thermal management system. In one embodiment, the system may be a single semiconductor chip itself, or a stack or arrangement of multiple semiconductor chips. This full-chip temperature data may be received, for example, from a thermal analysis tool such as the thermal analysis tool 200.

In step 506, the method 500 receives thermal parameters for the electronic system to be managed by the thermal management system. In one embodiment, system thermal parameters include at least one of: electrical and/or thermal constraints of the electric system, external chip conditions (e.g., conditions within the electronic system but external to the semiconductor chips incorporated therein), electronic system usage conditions, thermal management system type (e.g., mechanical, fluid-based, etc.), thermal management system materials, air or fluid flow direction and/or orientation for the elements of the thermal management system and semiconductor chip package materials.

In step 508, the method 500 determined the optimal thermal management configuration of the system in accordance with the full-chip temperature data and the system thermal parameters. That is, the method 500 determines, based on a plurality of inputs including the actual temperate gradients within the semiconductor chip(s) and the thermal requirements of the electronic system, the degree of thermal management required in each area of the electric system (e.g., the type, location and direction of elements of the thermal management system). One embodiment of a method for processing this plurality of inputs to determine the optimal thermal management configuration is described in greater detail in FIG. 6.

In one embodiment, the plurality of inputs specifically includes at least one of: thermal characteristics of the cooling and/or heating components of the thermal management system (e.g., thermal conductivity, heat transfer coefficient, thermal resistances of junction-to-air, junction-to-case, case-to-spreader, etc.), physical dimensions of the elements of the thermal management system, constraints of the thermal management system (e.g., switch on and off latency, zone of effectiveness, cost, mechanical characteristics, electric power consumed, environmental factor such as noise, etc.).

The effectiveness of each of these inputs in equalizing temperature and thermal gradient effect on the semiconductor chip(s) is assessed. In particular, thermal characteristics of the thermal management system enable the method 500 to assess the temperature values in the semiconductor chip design(s) using boundary conditions presented by the thermal management system. Chip temperatures and their influence on the electrical characteristics of the semiconductor chip design are computed using these boundary conditions and then applied to optimize the configuration of the thermal management system.

Because the temperature gradient may vary widely over a semiconductor chip in operation, some areas of a semiconductor chip may require a great deal of cooling or warming, while other areas may require very little cooling or warming. Based on this determination, thermal management resources may be allocated in the most efficient manner among components in the electronic system, as well as among components incorporated within the semiconductor chip(s). In one embodiment, the optimal thermal management configuration may involve directing thermal management resources toward local "hot spots" on a semiconductor chip, e.g., by repositioning elements a cooling system (e.g., to redirect air or fluid flow), by adjusting the design of components of the thermal management system (e.g., a heat sink) or by adjusting the orientation of the semiconductor chip package to account for a direction of cooling (e.g., air or fluid flow).

In one embodiment, the optimal thermal management configuration specifies a plurality of parameters, including at least one of: coordinates or positions of the thermal management system components with respect to a reference point in the semiconductor chip design(s) (e.g., Cartesian or spherical coordinates), orientation of the thermal management system components with respect to the semiconductor chip(s) whose full-chip temperature data is received in step 504, and state-dependent conditions for the thermal management system. For example, in the case where on-chip control of the thermal management system is enabled (e.g., such that the operating states of the thermal management system are controllable in response to thermal gradients associated with each operating state of the semiconductor chip designs(s)), the internal state of the semiconductor chip(s) and the associated thermal gradient computations are used to set the operating state of the thermal management system. In one embodiment, the operation state of the thermal management system includes mechanisms that influence the heat transfer between the semiconductor chip (s) and the surrounding environment, such as fan turn on and turn off, fan speed, electrostatic airflow rate, heating components, injection of coolants, evaporation rate control and ionization density.

In the case where on-chip control of the thermal management system is not enabled, the positions of the thermal management system are designed and implemented to alleviate the worst-case temperature-dependent electrical failure conditions.

In step 510, the method 500 calculates the full-chip temperature data for the semiconductor chip design(s0 incorporated in the electronic system (e.g., in accordance with the method 300), accounting for the optimal thermal management configuration as determined in step 508.

In step 512, the method 500 determines whether the electronic system requirements (which include individual semiconductor chip requirements) are met, according to the newly calculated full-chip temperature data. Thus, the method 500 determines whether the optimal thermal management configuration determined in step 508 will sufficiently manage the temperatures and thermal gradients of the electronic system as required. If the system requirements are met, the method 500 terminates in step 514. Alternatively, if the system requirements are not met, the method 500 returns to step 508 are proceeds as described above in order to adjust the thermal management configuration for optimal performance within the constraints of the system.

The method 500 thereby enables more efficient design of thermal management systems for electronic systems by accounting for the full-chip thermal gradients of the semiconductor chips incorporated therein. Based on this information, thermal management resources can be allocated to the various areas of the electronic system and/or semiconductor chip(s) in the most efficient manner. This provides better use of thermal management resources than existing thermal management systems, which tend to manage the temperatures and thermal gradients the electronic system in a more general manner (e.g., based on the absolute temperature value, with little or no regard to actual local variations in temperature). Thus, electronic system failures and waste of thermal management system resources can be significantly reduced.

In addition, the full-chip temperature data (e.g., as computed by the method 300) may be implemented in designing the heat transfer properties of a semiconductor chip package, thereby also efficiently reducing the thermal gradients over the semiconductor chip. For example, for packages incorporating multiple semiconductor chips, the method 500, in conjunction with the full-chip temperature data, may guide the arrangement of the multiple semiconductor chips that offers the best thermal management of the electrical or thermal constraints on the electronic system design. Thus, semiconductor package design as well as cooling system design may be enhanced by application of the method 300 and/or the method 500.

Figure 6:
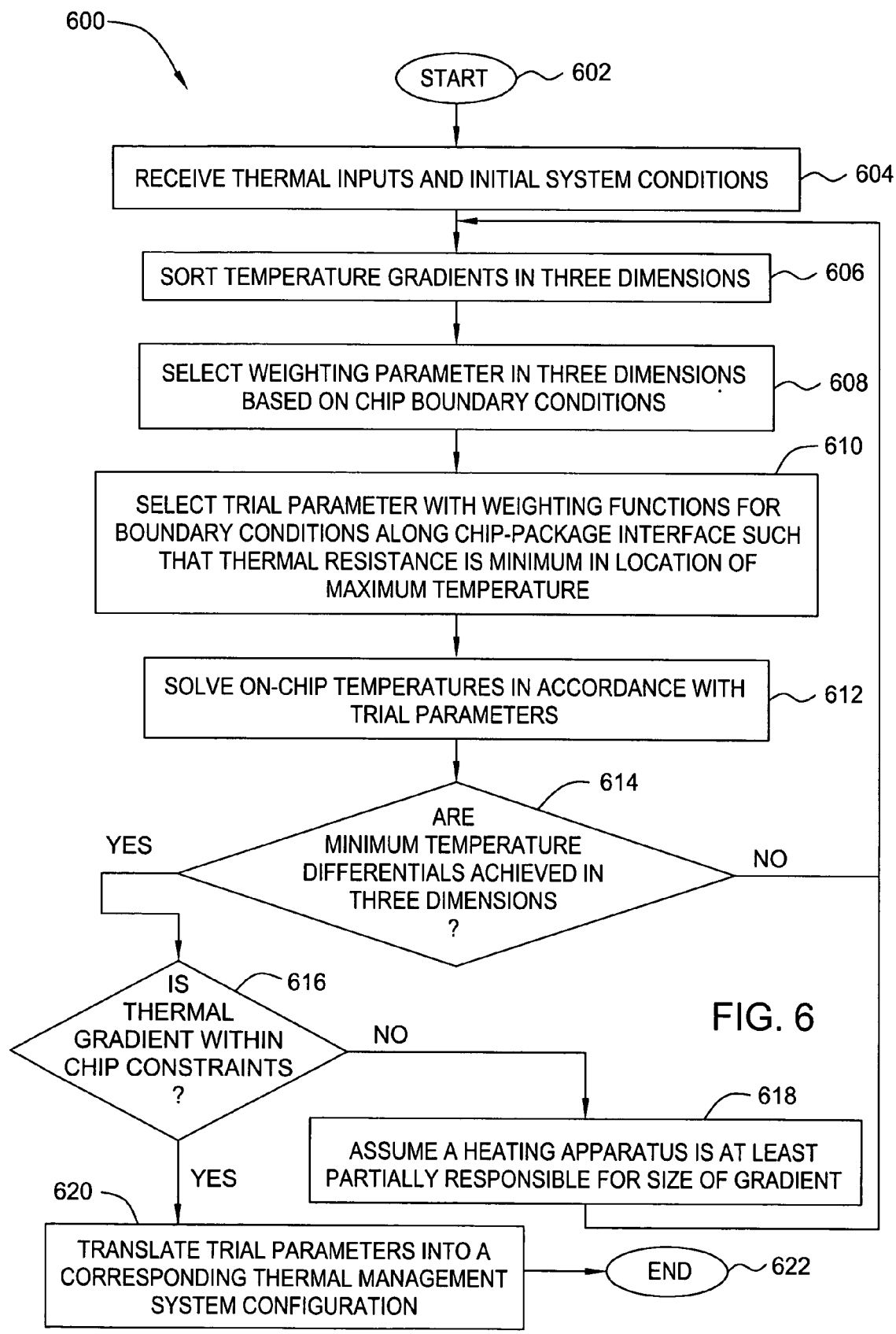
FIG. 6 is a flow diagram illustrating one embodiment of a method for processing semiconductor chip design and temperature data to produce parameters for an optimal thermal management configuration.

FIG. 6 is a flow diagram illustrating one embodiment of a method 600 for processing semiconductor chip design and temperature data to produce parameters for an optimal thermal management configuration. The method 600 may be implemented, for example, in accordance with steps 508-512 of the method 500.

The method 600 is initialized at step 602 and proceeds to step 604, where the method 600 receives the thermal inputs described above (e.g., full-chip temperature data, thermal characteristics of the cooling and/or heating components of the thermal management system, physical dimensions of the elements of the thermal management system and constraints of the thermal management system) and the initial conditions for the electronic system. In one embodiment, the initial conditions for the electronic system include at least one of: starting temperatures for the semiconductor chips incorporated therein, ambient temperatures in which the electronic system is intended to work, the position and efficiency of thermal management systems incorporated therein (e.g., the thermal resistances of the heat sinks, fans, etc.).

In step 606, the method 600 sorts the temperature gradients within the semiconductor chip(s) incorporated in the electric system design. The temperature gradients are sorted in three dimensions. In one embodiment, the temperature gradients are sorted according to the magnitudes of the gradients (e.g., from smallest gradient to largest gradient).

In step 608, the method 600 selects a weighting parameter in three dimensions (e.g., x, y and z) based on the initial chip boundary conditions. Essentially, the weighting parameter is a specific parameter that aids in ranking those areas of the semiconductor chip that can most efficiently dissipate heat In one embodiment, the weighting parameter is a thermal property of a given location on the semiconductor chip, such as at least one of: composite conductivity in the heat transfer direction, thermal conductance in the heat transfer direction, thermal resistance from a first location to a second location (e.g., from junction to ambient) and heat transfer coefficient. The selection of the weighting parameter may vary as a function of the semiconductor chip's layout and/or material properties.

In step 610, the method 600 selects a set of trial parameters with weighting functions for the boundary conditions along the semiconductor chip/package interface. In one embodiment, the set of trial parameters includes at least one of: thermal resistance, heat transfer coefficients between the semiconductor chip package and the thermal management system, and internal conductivity factors of the semiconductor chips (e.g., to optimize the paths that will lead to lower temperature gradients). In one embodiment, the set of trial parameters is chosen such that the thermal resistance is at a minimum in the location or region of the maximum on-chip temperature. This implies that the direction of the heat flow is taken into account in the choice of location for the minimum thermal resistance, and that the magnitude of the temperature is used to determine the value of the thermal resistance achievable using the thermal management system.

In step 612, the method 600 solves the on-chip temperatures in accordance with the selected trail parameters. In one embodiment, step 612 may be performed in accordance with the method 300 described above.

In step 614, the method 600 determines for each semiconductor chip incorporated in the electronic system, whether the minimum temperature differentials (e.g., as defined by design constraints on the semiconductor chip) are achieved in three dimensions, based on the on-chip temperatures calculated in step 612.

If the method 600 determines in step 614 that the minimum temperature differentials are not achieved in three directions for all semiconductor chips, the method 600 returns to step 606 and proceeds as described above in order to select a new set of trial parameters for those chips.

Alternatively, if the method 600 determines in step 614 that the minimum temperature differentials are achieved in three directions for all semiconductor chips, the method 600 proceeds to step 616 and determines for each semiconductor chip incorporated in the electronic system, whether predefined design constraints on the on-chip thermal gradient are met.

If the method 600 determines in step 616 that the thermal gradients are not within the design constraints for all semiconductor chips, the method 600 proceeds to step 618 and assumes that a heating component of the thermal management system is at least partially responsible for the oversized thermal gradient(s). The method 600 then returns to step 606 and proceeds as described above in order to select a new set of trial parameters for those chips.

Alternatively, if the method 600 determines in step 616 that the thermal gradients are within the design constraints for all semiconductor chips, the method 600 proceeds to step 620 and translates the selected trial parameters into a corresponding thermal management system configuration (e.g., including coordinates or positions of the thermal management system components with respect to a reference point in the semiconductor chip design, orientation of the thermal management system components with respect to the semiconductor chip whose full-chip temperature data is received in step 504, and state-dependent conditions for the thermal management system, as described above with respect to the method 500).

The method 600 then terminates in step 622.

Figure 7:
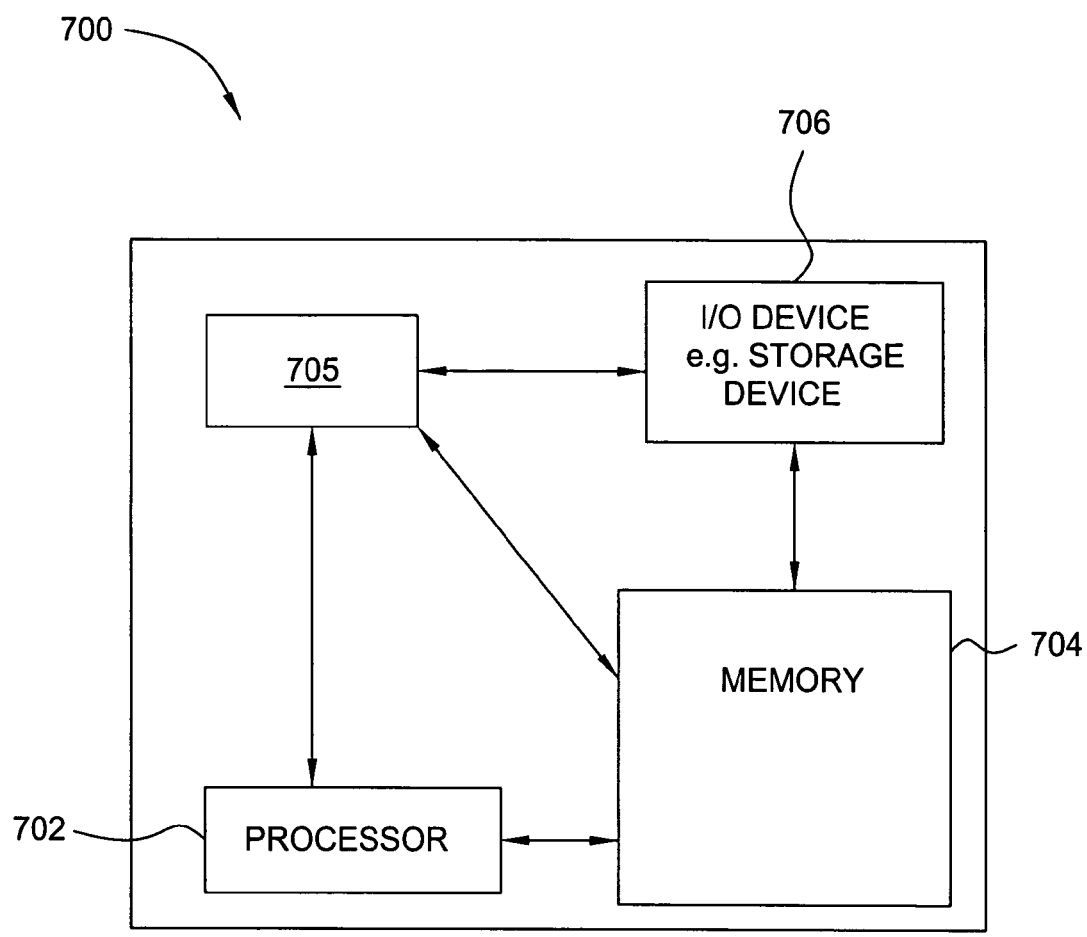
FIG. 7 is a high level block diagram of the present thermal management optimization method that is implemented using a general purpose computing device.

FIG. 7 is a high level block diagram of the present thermal management optimization method that is implemented using a general purpose computing device 700. In one embodiment, a general purpose computing device 700 comprises a processor 702, a memory 740, a thermal management optimization module 705 and various input/output (I/O) devices 706 such as a display, a keyboard, a mouse, a modem, a network connection and the like. In one embodiment, at least one I/O device is a storage device (e.g., a disk drive, an optical disk drive, a floppy disk drive). It should be understood that the thermal management optimization module 705 can be implemented as a physical device or subsystem that is coupled to a processor through a communication channel.

Alternatively, the thermal management optimization module 705 can be represented by one or more software applications (or even a combination of software and hardware, e.g., using Application Specific Integrated Circuits (ASIC)), where the software is loaded from a storage medium (e.g., I/O devices 706) and operated by the processor 702 in the memory 704 of the general purpose computing device 700. Additionally, the software may run in a distributed or partitioned fashion on two or more computing devices similar to the general purpose computing device 700. Thus, in one embodiment, the thermal management optimization module 705 for optimizing the design of a thermal management system for an electronic system described herein with reference to the preceding figures can be stored on a computer readable medium or carrier (e.g., RAM, magnetic or optical drive or diskette, and the like).

Thus, the present invention represents a significant advancement in the field of thermal management system design. Embodiments of the invention analyzes a full, three-dimensional solution of temperature values within a design of a semiconductor chip to be incorporated within an electronic system to be cooled, including power dissipation values distributed over semiconductor devices (e.g., transistors, resistors, capacitors, diodes and the like) and wire interconnects. This provides more a more accurate view of the thermal condition within the electronic device, thereby enabling a thermal management system designer to configure the thermal management system to manage heat in the electronic system in the most efficient manner. Specifically, by accounting for actual or calculated semiconductor chip temperature data in the initial design of the thermal management system (e.g., rather than designing a generic thermal management system or a thermal management system based on assumed chip temperatures), more efficient use of thermal management resources and more effective thermal management of an electronic system can be achieved.

While the foregoing is directed to embodiments of the invention, other and further embodiments of the invention may be devised without departing from the basic scope thereof, and the scope thereof is determined by the claims that follow.

What is claimed is:

1. A method for optimizing thermal management of an electronic system incorporating a plurality of components including a plurality of semiconductor chips, the method comprising:
receiving full-chip temperature data for said plurality of semiconductor chips; and
allocating one or more thermal management resources of a thermal management system among said plurality of components in said electronic system in accordance with said full-chip temperature data,
wherein said allocating comprises determining a configuration of said one or more thermal management resources allocated among said plurality of components; and
accounting for at least one thermal parameter of said electronic system, said at least one thermal parameter including at least one of: electrical constraints on said electric system, thermal constraints on said electronic system, conditions external to at least one of said plurality of semiconductor chips, usage conditions of said electronic system, a type of said thermal management system, materials comprising said thermal management system, a direction of air flow through said thermal management system, a direction of fluid flow through said thermal management system, an orientation of at least one of said some or more thermal management resources and materials comprising a package of at least one of said plurality of semiconductor chips.

2. The method of claim 1, wherein said full-chip temperature data comprises a model of a thermal gradient over at least one of said plurality of semiconductor chips in operation, said thermal gradient indicating temperature variations over various locations of said at least one of said plurality of semiconductor chips.

3. The method of claim 1, wherein said allocating further comprises:
identifying, via said full-chip temperature data, at least one area of at least one of said plurality of semiconductor chips; and
directing at least some of said thermal management resources to said at least one area of said at least one of said plurality of semiconductor chips.

4. The method of claim 3, wherein said directing comprises:
positioning at least some of said thermal management resources to cool said at least one area of said at least one of said plurality of semiconductor chips.

5. The method of claim 3, wherein said directing comprises:
adjusting an orientation of at least one of said plurality of semiconductor chips such that at least some of said thermal management resources are positioned to cool said at least one area of said at least one of said plurality of semiconductor chips.

6. The method of claim 3, wherein said directing comprises:
adjusting a heat sink design based, at least in part, on said at least one area of said at least one of said plurality of semiconductor chips.

7. The method of claim 3, wherein said directing comprises:
configuring said thermal management resources to locally minimize at least one thermal gradient within said at least one of said plurality of semiconductor chips.

8. The method of claim 1, wherein said at least one area of said at least one of said plurality of semiconductor chips is identified to alleviate worst-case temperature-dependent electrical failure conditions.

9. The method of claim 1, wherein said directing comprises:
positioning at least some of said one or more thermal management resources to warm said at least one area of said at least one of said plurality of semiconductor chips.

10. The method of claim 1, further comprising:
adjusting, in accordance with said allocating, a package design for at least one of said plurality of semiconductor chips.

11. The method of claim 1, further comprising:
adjusting, in accordance with said allocating, an arrangement of two or more of said plurality of semiconductor chips arranged in a package within said electronic system.

12. The method of claim 1, further comprising:
designing, in accordance with said allocating, an interface between said thermal management system and at least one of said plurality of semiconductor chips.

13. The method of claim 1, further comprising:
computing updated full-chip temperature data for said plurality of semiconductor chips in accordance with said allocating; and
re-assessing said allocating, in accordance with said updated full-chip temperature data.

14. The method of claim 1, wherein said thermal management system is at least one of: a mechanical thermal management system and a fluid-based thermal management system.

15. The method of claim 1, wherein said thermal management system is at least partly external to at least one of said plurality of semiconductor chips.

16. The method of claim 1, wherein said thermal management system is at least partly internal to at least one of said plurality of semiconductor chips.

17. The method of claim 1, wherein said thermal management system comprises at least one of: a cooling system and a warming system.

18. The method of claim 1, wherein at least a portion of said thermal management system is an on-chip thermal management system.

19. The method of claim 1, wherein said allocating reduces thermal gradients over at least one of said plurality of semiconductor chips.

20. The method of claim 1, further comprising:
allocating at least some of said one or more thermal management resources among components incorporated within at least one of said plurality of semiconductor chips, in accordance with said full-chip temperature data.

21. The method of claim 1, wherein said determining a configuration comprises determining, for said one or more thermal management resources, at least one of: a type of said one or more thermal management resources, a material of said one or more thermal management resources, a configuration of said one or more thermal management resources, a location of said one or more thermal management resources, an orientation of said one or more thermal management resources, or a direction of said one or more thermal management resources.

22. The method of claim 1, wherein said electronic system comprises a package incorporating said plurality of semiconductor chips.

23. The method of claim 22, wherein said plurality of semiconductor chips are arranged in a stack.

24. The method of claim 1, wherein said plurality of components is said plurality of semiconductor chips.

25. A computer readable medium containing an executable program for optimizing thermal management of an electronic system incorporation a plurality of components including a plurality of semiconductor chips, where the program performs the steps of:
   receiving full-chip temperature data for said plurality of semiconductor chips; and
   allocating one or more thermal management resources of a thermal management system among said plurality of components in said electronic system in accordance with said full-chip temperature data,
   wherein said allocating comprises determining a configuration of said one or more thermal management resources allocated among said plurality of components; and
   accounting for at least one thermal parameter of said electronic system, said at least one thermal parameter including at least one of: electrical constraints on said electronic system, thermal constraints on said electronic system, conditions external to at least one of said plurality of semiconductor chips, usage conditions of said electronic system, a type of said thermal management system, materials comprising said thermal management system, a direction of air flow through said thermal management system, a direction of fluid flow through said thermal management system, an orientation of at least some of said one or more thermal management resources and materials comprising a package of at least one of said plurality of semiconductor chips.

26. The computer readable medium of claim 25, wherein said full-chip temperature data comprises a model of a thermal gradient over at least one of said plurality of semiconductor chips in operation, said thermal gradient indicating temperature variations over various locations of said at least one of said plurality of semiconductor chips.

27. The computer readable medium of claim 25, wherein said allocating further comprises:
   identifying, via said full-chip temperature data, at least one area of at least one of said plurality of semiconductor chips; and
   directing at least some of said thermal management resources to said at least one area of said at least one of said plurality of semiconductor chips.

28. The computer readable medium of claim 25, further comprising:
   computing undated full-chip temperature data for said plurality of semiconductor chips in accordance with said allocating; and
   re-assessing said allocating, in accordance with said updated full-chip temperature data.

29. Apparatus for optimizing thermal management of an electronic system incorporating a plurality of components including a plurality of semiconductor chips, the apparatus comprising:
   means for receiving full-chip temperature data for said plurality of semiconductor chips; and
   means for allocating one or more thermal management resources of a thermal management system among said plurality of components in said electronic system in accordance with said full-chip temperature data,
   wherein said allocating comprises determining a configuration of said one or more thermal management resources allocated among said plurality of components; and
   accounting for at least one thermal parameter of said electronic system, said at least one thermal parameter including at least one of: electrical constraints on said electronic system, thermal constraints on said electronic system, conditions external to at least one of said plurality of semiconductor chips, usage conditions of said electronic system, a type of said thermal management system, materials comprising said thermal management system, a direction of air flow through said thermal management system, a direction of fluid flow through said thermal management system, an orientation of at least some of said one or more thermal management resources and materials comprising a package of at least one of said plurality of semiconductor chips.

* * * * *